United States Patent Office 3,063,822
Patented Nov. 13, 1962

3,063,822
HERBICIDAL METHOD
Quentin F. Soper, Indianapolis, Ind., assignor to Eli Lilly
and Company, Indianapolis, Ind., a corporation of
Indiana
No Drawing. Filed Sept. 15, 1960, Ser. No. 56,111
7 Claims. (Cl. 71—2.3)

This is a continuation-in-part of my copending U.S. patent application Serial No. 807,348, filed April 20, 1959, now abandoned.

This invention relates to novel herbicidal compositions having selective action and to processes employing them. More particularly, this invention relates to novel herbicidal processes employing compositions in which a diphenylacetonitrile or a diphenylacetamide is the herbicidally active ingredient.

In the past, herbicidal compositions have been available which were adequate for the selective elimination of mature wideleafed grasses such as crabgrass from turfs of narrow-leafed grasses such as bluegrass or bentgrass. Such herbicidal compositions ordinarily achieved selectivity by physical as opposed to chemical means; that is, more of the herbicidal spray or dust adhered to the wider, more hairy blades of the undesired grasses than to the narrow, upright blades of the desirable grasses. However, these herbicidal compositions were not broadly suitable for nonselective application to leguminous or other nongrass crops, for example, as by application from an airplane, since the compositions possess some toxicity for all varieties of plants. Furthermore, only a very few products have been available which could destroy grasses such as crabgrass or foxtail in the pre-emergent stage or in the immediate post-emergent or seedling stage. Such products as were or are still available generally contain a heavy metal compound, particularly a compound of arsenic or mercury, as the chief toxicant. These heavy metal compounds are not only toxic to children and pets, but also the heavy metals themselves have a residual toxicity toward the more desirable plants in the treated area, and this residual toxicity can continue to affect their growth for several years.

It is an object of this invention to provide compositions which are toxic only to grasses in their germinating or seedling stages and which are nontoxic for turfs, for crops, for ornamental plants, and for mammals. It is a further object of this invention to provide novel compositions and processes which can eliminate all seedling grasses selectively from crop plants or ornamentals such as alfalfa, clover, cotton, tomatoes, soybeans, marigolds and cockscomb, without damage to the crop or ornamental plant. It is a still further object of this invention to provide compositions and processes using those compositions which can selectively kill undesirable grasses such as foxtail and crabgrass when they are present in either the germinating or seedling stages of growth in an established bluegrass or bentgrass or Bermuda turf.

In fulfillment of the above and other objects, this invention provides a process for the pre- and immediately post-emergent destruction of grasses which comprises applying to a locus infested with grass seeds and/or seedling grasses a herbicidal amount of a compound represented by the following formula:

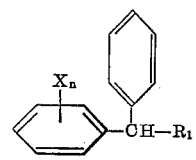

wherein X is chlorine or fluorine; $R_1$ is a nitrile (CN) or a carboxamide (CONHR) group; R is hydrogen, an alkyl group having from 1–3 carbon atoms, such as methyl, ethyl, n-propyl or isopropyl, or an alkylene group having 2 or 3 carbon atoms, such as vinyl, allyl, or crotyl; and $n$ is 0, 1, 2 or 3.

Illustrative compounds within the scope of the above formula include (4-chlorophenyl)phenylacetonitrile, (4-chlorophenyl)phenylacetamide, diphenylacetonitrile, diphenylacetamide, (2-chlorophenyl)phenylacetonitrile, (3-chlorophenyl)phenylacetamide, (4-fluorophenyl)phenylacetamide, (2,4-difluorophenyl)phenylacetonitrile, (3,4-dichlorophenyl)phenylacetonitrile, (3-chlorophenyl)-phenylacetonitrile, (2,4,5-trichlorophenyl)phenylacetonitrile, N-methyl diphenylacetamide, N-ethyl (4-chlorophenyl)phenylacetamide, N-allyl (4-tolyl)phenylacetamide, N-crotyldiphenylacetamide, and the like.

Other aromatic and chlorinated aromatic rings such as the thienyl or chlorthienyl ring can be used in place of one or both of the phenyl rings in the above compound without departing from the spirit or scope of this invention.

Compounds having the above structure preferably are formulated for use as pre-emergent and post-emergent selective herbicides either as dusts, spray concentrates, spreadable granules, or wettable powders. The compounds are quite insoluble in water, and hence for the preparation of emulsion-type sprays or wettable powders, the compounds desirably are formulated with a wetting agent or surfactant.

The novel processes of this invention comprise treating a soil area or locus infested with grass seeds and seedling grasses with a dust, granular formulation, or spray containing a compound within the scope of the above formula as the herbicidally active ingredient. Typical of soil areas which can be treated are turfs or sods such as bluegrass turf, zoysia turf, St. Augustine turf, bentgrass turf, fescue turf, Bermuda turf, or mixtures of these containing in addition seeds and/or seedlings of undesirable grasses; crop-growing areas in which crops other than grasses are being grown; flower beds, strawberry patches and similar areas of cultivation; and in other miscellaneous places such as gravel driveways, walks, road shoulders, and the like where the elimination of seedling grasses is desired. Compositions containing the herbicidally active compound are sprayed, dusted, or spread by methods well known to the art onto the particular area at the rate of from 2 to 32 lbs. or somewhat more; for example, 40 lbs. per acre of active ingredient. For most field applications, I prefer to spray or dust the herbicidal compositions of this invention at the rate of from about 20 to about 30 lbs. of active ingredient per acre. If, however, the herbicidal compositions are spread in a granular form on the field to be treated, I prefer to employ a greater amount of active material per acre, said greater amount being in the range of from 30 to 40 lbs. of an active diphenylacetonitrile or diphenylacetamide per acre.

Seedlings and germinating seeds of many varieties of grasses are killed by the above treatment process, including both undesirable grasses such as the crabgrasses (*Digitaria sanguinalis* and *Digitaria ischaemum*); green and yellow foxtails (*Setaria viridis* and *Setaria lutescens*); Johnson grass (*Sorghum halepense*); goose grass (*Eleusine indica*); sandbur (*Cenchrus pauciflorus*); witchgrass (*Panicum capillare*) and the like, as well as the seedlings of desirable grasses such as Bermuda grass (*Cynodon dactylon*); Kentucky bluegrass (*Poa pratensis*, including both Merion and Delta strains); field and sweet corn (*Zea mays*); fescue (*Festuca elatior*); domestic oats (*Avena sativa*); orchard grass (*Dactylis glomerata*); red top (*Agrostis alba*); rye (*Secale cereale*); Italian ryegrass (*Lolium multiflorum*); sorghum (*Sorghum vulgare*); timothy (*Phleum pratense*); wheat (*Triticum sestivum*) and the like.

As previously stated, the herbicidal compositions of this invention do not affect leguminous plants either in the pre-emergent germinating stage of growth, the post-emergent seedling stage, or the mature stage of growth. Among the leguminous plants which will tolerate concentrations of the herbicidal compositions of this invention sufficient to eliminate grasses in the pre-emergent and immediately post-emergent growth stage are the following: alfalfa (*Medicago sativa*); bush or pole beans (*Phaseolus vulgaris*); crimson clover (*Trifolium incarnatum*); Dutch white clover and Ladine clover (*Trifolium repens*); sweet clover (*Meliletus alba*); cowpeas (*Vigna sinensis*); lespedeza (*Lespedeza cuneata*); Alaska peas (*Pisum sativum*); soybeans (*Glycine max*); and hairy vetch (*Vicia villesa*).

When sprays or dusts containing a diphenylacetonitrile or a diphenylacetamide as represented by the above formula are applied at the rate of about 30 lbs. of herbicidal compound per acre to bluegrass or bentgrass turfs infested with foxtail and crabgrass, these undesirable grasses can be eradicated provided the spray or dust is applied before they become established. At a lower rate of application, for example 20 lbs. of herbicidal compound per acre, 80 percent of the foxtail and all of the crabgrass are eliminated by the treatment. On the other hand, amounts as high as 64 lbs. per acre of a herbicidally active diphenylacetonitrile or diphenylacetamide have not harmed turfs composed of bentgrasses, Bermuda grass, Kentucky bluegrass, centipede grass (*Eremochloa ophiuroides*), St. Augustine grass (*Stenotaphrum secundatum*) and zoysia (*Zoysia japonica*, Meyer strain).

In addition to eliminating crabgrass, foxtail, goose grass and other annual weed grasses from established lawns, the herbicidal compositions of this invention can be employed in other useful ways. For example, spray or dust compositions as provided by this invention can be used to eliminate seedling corn from a soybean field or to eradicate crabgrass from a perennial flower bed or to destroy germinating seeds of Bermuda grass in a cotton field. Other methods of employing the selective herbicidal compositions of this invention will be readily apparent to those skilled in the art.

While all of the diphenylacetonitriles and diphenylacetamides falling within the scope of the above formula show selective killing of grasses in the pre-emergent and/or immediately post-emergent stage of growth, certain of the compounds, particularly those with one or more chlorine atoms in the benzene ring, are specially advantageous in that they show some herbicidal action against broad-leaf weeds. For example, both 2-chlorophenyl)phenylacetonitrile and (2,4-dichlorophenyl)phenylacetonitrile show considerable herbicidal activity against rough pigweed (*Amaranthus retroflexus*) when applied at the rate of 8 lbs. per acre to an area containing this weed.

A number of the herbicidal methods and compositions of the present invention are illustrated by the following specific examples.

EXAMPLE 1

The following experimental procedure was used to demonstrate the efficacy of the compositions of this invention in killing germinating and seedling grasses without affecting the germination of seeds and the growth of seedlings of various broad-leaf and leguminous plants.

A soil was prepared consisting of 1 part masonry sand and 1 part shredded top soil blended together in a cement mixer. One gallon of this soil was placed in a 25 x 35 cm. galvanized flat and was patted down with a bench brush until level. A three-row marker was used to make 2½ cm. furrows in approximately two-fifths of the flat. Crop seeds consisting of four kernels of corn, five cotton seeds and five soybean seeds were placed in these furrows. A four-row template was then placed on the remaining soil and the indicated amounts of each of the following seeds were planted, one species to each section: ryegrass, 300–350 mg.; broad-leaf mustard (*Brassica juncea*), 50–75 mg.; rough pigweed, 30–50 mg.; and large crabgrass, 350–400 mg. In later testing, foxtail was substituted for ryegrass, and 100 mg. of seed were used. Sufficient soil was added to cover the entire flat. Thus, the weed seeds were covered to a depth of about 6 mm. and the crop plant seeds were covered to a depth of about 3 cm.

In assaying the effect of the compositions as pre-emergent herbicides, a flat prepared as above, taken either on the day of planting or on the next day, was placed in a chamber equipped with a turntable and an air exhaust. The herbicidal composition, whether it was a spray-type emulsion or a wettable powder, was applied to the flat with a modified DeVilbiss atomizer hooked to an air source. Twelve and one-half ml. of the composition under test were applied to each flat either on the day of planting or the succeeding day. For measuring the efficacy of the herbicidal compositions as post-emergent herbicides, the same experimental setup was used except that the flats were sprayed after nine to twelve days in a greenhouse, the length of growing time depending upon the season and light intensity. Injury ratings and observations as to type of injury were made in either case eleven to twelve days after treatment. The injury rating scale used was as follows:

1—no injury
2—slight injury
3—moderate injury
4—severe injury
5—death

When more than one determination was carried out, an average value was calculated for the injury rating.

Tables I and II which follow, set forth the results of pre-emergent and post-emergent testing of several diphenylacetonitrile and diphenylacetamide compounds. In both tables, column 1 gives the name of the compound; column 2, the rate in terms of pounds per acre at which the compound was applied to the test flat; and columns 3 to 9, the injury rating for the particular plant seeds or seedlings.

*Table I.—Injury Rating on Pre-Emergent Treatment*

| Compound | Lbs./acre | Corn | Cotton | Soybean | Crabgrass | Mustard | Pigweed | Ryegrass |
|---|---|---|---|---|---|---|---|---|
| Diphenylacetonitrile | 2 | 1.6 | 1.2 | 1.2 | 2.7 | 1.6 | 1 | 1 |
|  | 4 | 1.7 | 1 | 1 | 3.8 | 1 | 1 | 1.6 |
|  | 8 | 3.4 | 1 | 1.4 | 4.4 | 2 | 1.5 | 3.2 |
|  | 16 | 4.5 | 1 | 1.5 | 5 |  |  | 4 |
| Diphenylacetamide | 2 | 1 | 1 | 1 | 1.5 | 1.2 | 1 | 1 |
|  | 4 | 1 | 1 | 1 | 2.5 | 1.5 | 1 | 1 |
|  | 8 | 1 | 1 | 1 | 4 | 1.2 | 1.8 | 1.2 |
| (4-chlorophenyl)-phenylacetonitrile | 2 | 1 | 1 | 1 | 1.9 | 1.2 | 1 | 1 |
|  | 4 | 1 | 1 | 1 | 3.8 | 2 | 2 | 1 |
|  | 8 | 2.1 | 1 | 1 | 4.4 | 1.2 | 1 | 3.3 |
|  | 16 | 3.5 | 1 | 1 | 4.3 |  |  | 4 |
| (2-chlorophenyl)-phenylacetonitrile | 2 | 1 | 1 | 1 | 1 | 1 | 1 | 1 |
|  | 4 | 1 | 1 | 1 | 1 | 1.5 | 1.5 | 1 |
|  | 8 | 1.3 | 1 | 1 | 3.3 | 1.3 | 4 | 1.7 |
| (2-chlorophenyl)-phenylacetamide | 2 | 1.5 | 1 | 1 | 1 | 1 | 1.5 | 1 |
|  | 4 | 1 | 1 | 1 | 2 | 1 | 2 | 1 |
|  | 8 | 1 | 1 | 1 | 2.7 | 2 | 3 | 1 |
| (2,4-dichlorophenyl)-phenylacetonitrile | 2 | 1 | 1 | 1 | 2 | 1 | 2 | 1 |
|  | 8 | 1 | 1 | 1 | 4 | 1.5 | 3 | 1 |
| (3,4-dichlorophenyl)-phenylacetonitrile | 2 | 1 | 1 | 1 | 4 | 1 | 1 | 1 |
|  | 4 | 2 | 1 | 1 | 5 | 1 | 1 | 3 |
|  | 8 | 2.5 | 1 | 1 | 4.5 | 1 | 2 | 4 |
| (4-fluorophenyl)-phenylacetonitrile | 2 | 1 | 1 | 1 | 4 | 1 | 1 | 2 |
|  | 8 | 3.5 | 1.5 | 1.5 | 4.5 | 2 | 3 | 4 |
| (3-chlorophenyl)-phenylacetonitrile | 2 | 1 | 1 | 1 | 3 | 1 | 1 | 1 |
|  | 4 | 2 | 1 | 1 | 4 | 1 | 2 | 3 |
|  | 8 | 3.5 | 1.5 | 1 | 5 | 2 | 2.5 | 2.5 |

| Compound | Lbs./acre | Corn | Cotton | Soybean | Crabgrass | Mustard | Pigweed | Foxtail |
|---|---|---|---|---|---|---|---|---|
| N-allyl-diphenylacetamide | 8 | 1 | 1 | 1 | 4 | 4 | 4 | 3 |
|  | 2 | 1 | 1 | 1 | 2 | 2 | 3 | 1 |
| N-isopropyl-diphenylacetamide | 8 | 1 | 2 | 2 | 4 | 5 | 4 | 3 |
|  | 2 | 1 | 1 | 1 | 2 | 3 | 2 | 2 |
| N-(n-propyl)-diphenylacetamide | 8 | 1 | 1 | 1 | 4 | 3 | 4 | 3 |
|  | 2 | 1 | 1 | 1 | 2 | 2 | 1 | 2 |
| N-methyl-diphenylacetamide | 8 | 1 | 1 | 2 | 4.5 | 2.5 | 3 | 2 |
|  | 4 | 1 | 1 | 1 | 3 | 3 | 3 | 2 |
|  | 2 | 1 | 1 | 1 | 2 | 1 | 1.5 | 1.5 |
| N-ethyl-diphenylacetamide | 8 | 1 | 1 | 2.5 | 4.5 | 3.5 | 3 | 2.5 |
|  | 4 | 1 | 1 | 2 | 2 | 4 | 2 | 2 |
|  | 2 | 1 | 3 | 1 | 2.5 | 2.5 | 1.5 | 1.5 |

*Table II.—Injury Rating on Post-Emergent Treatment*

| Compound | Lbs./acre | Corn | Cotton | Soybean | Crabgrass | Mustard | Pigweed | Ryegrass |
|---|---|---|---|---|---|---|---|---|
| Diphenylacetonitrile | 2 | 1.2 | 1 | 1 | 1.2 | 1 | 1 | 1 |
|  | 4 | 1.3 | 1 | 1 | 2.5 | 1 | 1 | 1 |
|  | 8 | 1.2 | 1.2 | 1.2 | 2.5 | 1 | 1 | 1.4 |
|  | 16 | 2.5 | 2 | 2 | 3 |  |  | 1 |
| Diphenylacetamide | 2 | 1 | 1 | 1 | 1.3 | 1 | 1 | 1 |
|  | 4 | 1 | 1 | 1 | 2.5 | 1 | 1 | 1 |
|  | 8 | 1 | 1.3 | 1.7 | 2.7 | 1 | 1 | 1.3 |
| (4-chlorophenyl)-phenylacetonitrile | 2 | 1 | 1.2 | 1 | 2.1 | 1.7 | 1 | 1 |
|  | 4 | 1 | 1 | 1 | 2.5 | 1 | 1 | 1 |
|  | 8 | 1.8 | 1 | 1 | 3.2 | 1.4 | 1.3 | 1.2 |
|  | 16 | 3 | 1 | 2 | 3 |  |  | 1 |
| (2-chlorophenyl)-phenylacetamide | 2 | 1.5 | 1.5 | 1.5 | 2.5 | 1.5 | 1 | 1 |
|  | 4 | 1 | 1 | 2 | 2 | 1 | 1 | 1 |
|  | 8 | 1 | 1.3 | 1.7 | 3.7 | 2.7 | 2.7 | 2 |
| (3,4-dichlorophenyl)-phenylacetonitrile | 2 | 2 | 1 | 1 | 4 | 1 | 2 | 1 |
|  | 4 | 2 | 1 | 1 | 4 | 1 | 2 | 1 |
|  | 8 | 2.5 | 1.5 | 2 | 4 | 1.5 | 2.5 | 1.5 |
| (4-fluorophenyl)-phenylacetonitrile | 2 | 2 | 1 | 1 | 3 | 1 | 1 | 1 |
|  | 8 | 1 | 1 | 1 | 4.5 | 1.5 | 1.5 | 1 |
| (3-chlorophenyl)-phenylacetonitrile | 2 | 2 | 1 | 2 | 3 | 1 | 1 | 1 |
|  | 4 | 1 | 1 | 2 | 3 | 1 | 1 | 2 |
|  | 8 | 2.5 | 2.5 | 3 | 4.5 | 3 | 3 | 2 |

| Compound | Lbs./acre | Corn | Cotton | Soybean | Crabgrass | Mustard | Pigweed | Foxtail |
|---|---|---|---|---|---|---|---|---|
| N-allyl-diphenylacetamide | 8 | 1 | 5 | 2 | 2 | 4 | 3 | 3 |
| N-isopropyl-diphenylacetamide | 8 | 1 | 5 | 3 | 1 | 4 | 3 | 2 |
| N-(n-propyl)-diphenylacetamide | 8 | 1 | 5 | 3 | 3 | 4 | 3 | 3 |

As is well understood in the art, rates of application of herbicide under the carefully controlled conditions of the greenhouse are from ½ to ¼ those required in the field.

In the above trials, the compound under test, whether a diphenylacetonitrile or a diphenylacetamide, was formulated as a spray by one of the following procedures. In one method the compound was wetted by grinding in a mortar with, or was dissolved in, one part of polyoxyethylene sorbitan mono-oleate. Five hundred parts of water were added slowly to the resultant creamy paste to give an aqueous dispersion with a surfactant concentration of 0.2 percent. This dispersion was entirely satisfactory for spray application. In a second procedure the compound was dissolved in one volume of acetone and the acetone solution was diluted with 19 volumes of water containing 0.1 percent of polyoxyethylene sorbitan monolaurate.

EXAMPLE 2

Further testing of certain of the compounds was carried out against a broader spectrum of plants including various crop and ornamental plants, broad-leaf plants, including legumes and turfs, as well as other weed and desirable grasses. In a pre-emergent test the seeds were sown in flats as in Example 1 and were treated with the formulated compound the following day. Observations as to injury rating were made in most cases 14 days after treatment. However, as 3 weeks' time is required for certain slow-growing species, observations were made up to 21 days after treatment.

In a post-emergent extended test the various species of plants were seeded in 3 in square wood bands with bottoms. Soil was placed in the band and pressed down to an even depth. Small seeds were planted by covering them with up to ¼ inch of soil, whereas large seeds, such as beans, corn, cotton, sorghum and the like, were planted ½ inch or more below the surface of the soil. The planted boxes were placed in a greenhouse, and by judiciously regulating the planting time, plants of different types were readied for treatment at the same time, despite the wide difference (7 to 21 days) in the time required for seeds of the various plants to germinate and for the seedlings to grow to a suitable size.

Flats containing one box of each of the species under test were assembled and sprayed with the test material by the procedure described above in Example 1. Tables III through VI set forth the test results.

The lack of toxicity of the compositions of this invention for established turfs was demonstrated as follows: Turfs were obtained from outdoor grass nurseries and were removed to a greenhouse. There the turfs were maintained in a growing condition for about 4 to 5 months with regular mowing. A 3" x 3" piece of turf was placed in a box and sprayed with the test materials in the manner previously described. Turfs of the following grasses were used in this testing: 3 strains of bentgrass, Bermuda grass, Kentucky bluegrass, centipede grass, St. Augustine grass and Meyer zoysia grass. Table VII gives the results of extended testing with turfs.

In Tables III through VII which follow, there are recorded the results of extended testing of two compounds, diphenylacetonitrile and (4-chlorophenyl)phenylacetonitrile, by the methods outlined above. Both of these compounds had shown outstanding activity in the previous test against crabgrass in both pre- and post-emergent testing. The injury ratings used in Tables III through VII are the same as those used in Tables I and II; the values of the injury ratings are average values in each case. In Tables III through VI, column 1 gives the name of the plant used; column 2, its variety; column 3, the results of pre-emergent treatment at 2, 4, 8 and 16 pounds per acre of diphenylacetonitrile; column 4, the results at the same rates of application for the same compound in post-emergent testing; and columns 5 and 6, the corresponding data for (4-chlorophenyl)phenylacetonitrile with regard to injury rating in pre- and post-emergent testing at rates of application of 2, 4, 8 and 16 pounds per acre. In Table VII only injury ratings against established turfs at 2, 4, 8 and 16 pounds per acre of diphenylacetonitrile and of (4-chlorophenyl)phenylacetonitrile are recorded.

*Table III.—Injury Rating on Pre- and Post-Emergent Treatment—Legumes*

| Name | Variety | Diphenylacetonitrile | | | | | | | | (4-chlorophenyl)phenylacetonitrile | | | | | | | |
|---|---|---|---|---|---|---|---|---|---|---|---|---|---|---|---|---|---|
| | | Pre | | | | Post | | | | Pre | | | | Post | | | |
| | | 2 | 4 | 8 | 16 | 2 | 4 | 8 | 16 | 2 | 4 | 8 | 16 | 2 | 4 | 8 | 16 |
| Alfalfa | Hans Grimm | 1 | 1 | 1 | 1 | 1 | 1 | 1 | 1.5 | 1 | 1 | 1 | 1 | 1 | 2 | 2 | 2.5 |
| Do | Ranger | 1 | 1 | 1 | 1 | 1 | 1.5 | 1.5 | 2 | 1 | 1 | 1 | 1 | 1.2 | 1.3 | 2 | 3 |
| Beans | Contender | 1 | 1 | 1 | 1 | 1 | 1 | 1 | 1 | 1 | 1 | 1 | 1 | 1 | 1 | 1 | 1 |
| Do | Tendergreen | 1.5 | 1 | 1 | 1 | 1 | 1 | 1 | 1.5 | 1 | 1 | 1 | 1 | 1 | 1 | 1 | 1 |
| Clover | Crimson | 1 | 1.5 | 1 | 1.5 | 1 | 1.5 | 1 | 2.5 | 1 | 1 | 2.5 | 2 | 1 | 1 | 2 | 2 |
| Do | Dutch White | 1.5 | 1 | 1 | 3 | 1 | 1 | 1 | 1 | 1 | 2 | 1.5 | 2.5 | 1 | 1 | 1 | 1.5 |
| Do | Ladino | 2.5 | 1 | 1 | 2 | 1 | 1 | 1.5 | 2.5 | 1 | 2.5 | 1 | 4 | 1 | 1 | 1 | 1.5 |
| Do | Sweet | 1.5 | 1 | 1 | 3 | 1 | 1 | 1 | 1 | 1 | 1.5 | 1.5 | 3.5 | 1 | 1 | 1 | 1 |
| Cowpeas | Brown Sugar | 1.5 | 1 | 2 | 1.5 | 1 | 1 | 1 | 1 | 1 | 1 | 1 | 1 | 1 | 1 | 2 | 2 |
| Lespedeza | Sericea | 1.5 | 2 | 2 | 3 | 2 | 2 | 2.5 | 2.5 | 1 | 1 | 1.5 | 2 | 2 | 2 | 2 | 2.5 |
| Peas | Alaska | 1 | 1 | 1 | 1 | 1 | 1 | 1.5 | 2 | 1 | 1 | 1 | 1.5 | 1 | 1 | 1 | 1 |
| Soybeans | Lincoln | 1.2 | 1 | 1.4 | 1.5 | 1 | 1 | 1.2 | 2 | 1 | 1 | 1 | 1 | 1 | 1 | 1 | 2 |
| Vetch | Hairy | 1 | 1 | 1.5 | 2 | 1 | 1 | 2 | 2 | 1 | 1 | 1 | 2 | 1 | 1 | 2 | 3 |

*Table IV.—Injury Rating on Pre- and Post-Emergent Treatment—Seedling Crop and Turf Grasses*

| Name | Variety | Diphenylacetonitrile | | | | | | | | (4-chlorophenyl)phenylacetonitrile | | | | | | | |
|---|---|---|---|---|---|---|---|---|---|---|---|---|---|---|---|---|---|
| | | Pre | | | | Post | | | | Pre | | | | Post | | | |
| | | 2 | 4 | 8 | 16 | 2 | 4 | 8 | 16 | 2 | 4 | 8 | 16 | 2 | 4 | 8 | 16 |
| Bermuda | U-3 | 3 | 4 | 5 | 5 | 2 | 1.5 | 2 | 2 | 3 | 3.5 | 4 | 5 | 1.5 | 2 | 1.5 | 1 |
| Bluegrass | Kentucky | 2 | 2.7 | 4.3 | 5 | 1 | 1 | 1 | 1.5 | 2.7 | 4 | 4.6 | 4.7 | 1.5 | 1.2 | 2.2 | 2 |
| Do | Merion | 2 | 4 | 4.5 | 5 | 2 | 2 | 2 | 3 | 1 | 3 | 4 | 4 | 2 | 1.5 | 1 | 2 |
| Corn, field | Pfister hybrid | 1.6 | 1.7 | 3.4 | 4.5 | 1.2 | 1.3 | 1.2 | 2.5 | 1 | 1 | 2.1 | 3.5 | 1 | 1 | 1.8 | 3 |
| Corn, sweet | Country Gentleman | 1.5 | 2 | 5 | 5 | 1 | 2 | 1.5 | 4 | 1 | 5 | 5 | 5 | 1 | 1 | 1 | 3 |
| Do | Golden Bantam | 1 | 1 | 3.5 | 4.5 | 1 | 1 | 1 | 2 | 1 | 1 | 1 | 4 | 1 | 2 | 1 | 1.5 |
| Fescue | Meadow | 1 | 1 | 3 | 4 | 1 | 1 | 1.5 | 2 | 2.5 | 2 | 3 | 2.5 | 1 | 1 | 1.3 | 1.3 |
| Oats | Clinton | 1 | 2 | 2 | 3 | 1 | 1 | 1 | 2 | 1 | 1 | 1 | 1 | 1 | 1 | 1 | 2 |
| Oats, wild | | 1 | 2 | 2 | 3 | 1 | 1 | 1 | 2 | 1 | 1 | 1.3 | 1 | 1.2 | 1.3 | 1.3 | 1 |
| Orchard Grass | | 1 | 3 | 4 | 4 | 1 | 1.5 | 2.5 | 3 | 2 | 2 | 2.5 | 3 | 1 | 1 | 2 | 2.5 |
| Red Top | | 4 | 5 | 5 | 5 | 1 | 1 | 3 | 3.5 | 3 | 3.5 | 4 | 5 | 1.3 | 2 | 2 | 2.3 |
| Rye | Balboa | 1 | 2 | 2 | 3 | 1 | 1 | 1 | 1 | 1 | 1 | 1 | 1 | 1 | 1 | 1 | 1 |
| Ryegrass | Italian | 1 | 1.6 | 3.2 | 4 | 1 | 1 | 1.4 | 1 | 1 | 1 | 3.3 | 4 | 1 | 1 | 1.2 | 1 |
| Sorghum | Amak R-10 hybrid | 3 | 3 | 4.5 | 5 | 2 | 1.5 | 2 | 2.5 | 1 | 2 | 4 | 4 | 1 | 1 | 1.5 | 2 |
| Timothy | | 2 | 4 | 5 | 5 | 1 | 2 | 3 | 3.5 | 1 | 3 | 4 | 4 | 2 | 2.5 | 2 | 1.5 |
| Wheat | Vermillion | 1 | 2 | 1.7 | 3 | 1 | 1 | 1 | 1 | 1 | 1 | 1 | 1 | 1 | 1 | 1.3 | 1 |

Table V.—Injury Rating on Pre- and Post-Emergent Treatment—Seedling Weed Grasses

| Name | Variety | Diphenylacetonitrile | | | | | | | | (4-chlorophenyl)phenylacetonitrile | | | | | | | |
|---|---|---|---|---|---|---|---|---|---|---|---|---|---|---|---|---|---|
| | | Pre | | | | Post | | | | Pre | | | | Post | | | |
| | | 2 | 4 | 8 | 16 | 2 | 4 | 8 | 16 | 2 | 4 | 8 | 16 | 2 | 4 | 8 | 16 |
| Crabgrass | Large | 2.7 | 3.8 | 4.4 | 5 | 1.2 | 2.5 | 2.5 | 3 | 1.9 | 3.8 | 4.4 | 4.3 | 2.1 | 2.5 | 3.2 | 3 |
| Do | Small | 3 | 3.3 | 5 | 5 | 2.3 | 2.3 | 2.3 | 3.7 | 2.2 | 3.7 | 4.5 | 5 | 1.2 | 2.7 | 3.3 | 3 |
| Foxtail | Green | 1.5 | 4 | 4.5 | 5 | 2 | 2 | 3 | 4 | 3.5 | 4 | 4.5 | 5 | 2 | 2.5 | 3 | 4 |
| Do | Yellow | 2.7 | 4.7 | 5 | 5 | 2 | 2.7 | 2.7 | 4 | 2.8 | 4 | 5 | 5 | 2.8 | 2.6 | 3.8 | 4.2 |
| Johnson Grass | | 1 | 2.5 | 3 | 5 | 1.5 | 2.5 | 2.5 | 3 | 1.5 | 3 | 3 | 4 | 2 | 1.5 | 2 | 2 |
| Goose Grass | | 5 | 5 | 5 | 5 | 3 | 3 | 3 | 4 | 5 | 5 | 5 | 5 | 2 | 2 | 3 | 4 |
| Sandbur | | 1.5 | 3 | 4 | 5 | 2 | 2.5 | 3 | 4 | 1 | 2.5 | 4 | 5 | 1 | 2.5 | 2 | 4 |
| Witch grass | | 1.5 | 5 | 5 | 5 | 1 | 1.5 | 1.5 | 1 | 1 | 3 | 4.5 | 5 | 1 | 1 | 1 | 1 |

Table VI.—Injury Rating on Pre- and Post-Emergent Treatment—Miscellaneous Broadleaf Plants

| Name | Variety | Diphenylacetonitrile | | | | | | | | (4-chlorophenyl)phenylacetonitrile | | | | | | | |
|---|---|---|---|---|---|---|---|---|---|---|---|---|---|---|---|---|---|
| | | Pre | | | | Post | | | | Pre | | | | Post | | | |
| | | 2 | 4 | 8 | 16 | 2 | 4 | 8 | 16 | 2 | 4 | 8 | 16 | 2 | 4 | 8 | 16 |
| Beets, red | Detroit | 1.5 | 1 | 1 | 2 | 1 | 1.5 | 2 | 2.5 | 1 | 1.5 | 2.5 | 2.5 | 1 | 1 | 2 | 2 |
| Beet, sugar | U.S. No. 359 | 1 | 1 | 2 | 1.5 | 1 | 1 | 1 | 1 | 1 | 1 | 1.3 | 1 | 1.5 | 1 | 1.3 | 2 |
| Bindweed | | | | | | | | | | 1 | 1 | 1 | | 1.5 | 1 | 1 | |
| Cockscomb | | 1 | 1 | 1 | 3 | | | | | 1 | 1 | 2 | 2 | | | | |
| Cotton | Delfos 9169 | 1.2 | 1 | 1 | 1 | 1 | 1 | 1.2 | 2 | 1 | 1 | 1 | 1 | 1.2 | 1 | 1 | 1 |
| Cucumber | Wisconsin SR-6 | 1 | 1 | 1 | 2 | 1 | 1 | 2 | 3 | 1 | 1.5 | 2 | 2 | 1.5 | 2 | 2.5 | 3 |
| Dichondra | | 1 | 1 | 1 | 3 | 1 | 1 | 1 | 1 | 1 | 1 | 1 | 1 | 1 | 1 | 1 | 1 |
| Flax | | 1 | 1.5 | 2 | 2 | 1 | 2 | 3 | 3.5 | 1 | 2 | 1.5 | 2 | 1 | 1 | 2 | 3 |
| Lettuce | Grand Rapids | 1 | 1 | 1.5 | 1.5 | 1 | 1 | 1.5 | 1.5 | 1 | 1 | 1 | 1 | 1.5 | 1 | 1 | 3 |
| Marigold | Burpeegold | 1 | 1 | 2 | 2 | | | | | 1 | 2 | 2 | 2 | | | | |
| Morning Glory | Heavenly Blue | 1 | 1 | 1 | 1 | | | | | 1 | 1 | 1 | 1 | | | | |
| Mustard | Florida Broadleaf | 1.6 | 1 | 2 | | 1 | 1 | 1 | | 1.2 | 1 | 1.2 | | 1.7 | 1 | 1.4 | |
| Pigweed | Rough | 1 | 1 | 1.5 | | 1 | 1 | 1 | | 1 | 2 | 1 | | 1 | 1 | 1.3 | |
| Radish | Early Scarlet | 1.5 | 1 | 1.5 | 1.5 | 1 | 1 | 1 | ½ | 1 | 1 | 1 | 1.5 | 1 | 1 | 1 | 1 |
| Tomatoes | Bonney Best | 1 | 1 | 1.5 | 2 | 1 | 1 | 1 | ½ | 1 | 1 | 1 | 1.5 | 1 | 1 | 2 | 3 |

Table VII.—Injury Rating on Post-Emergent Treatment—Established Turfs

| Name | Variety | Diphenylacetonitrile | | | | (4-chlorophenyl) phenylacetonitrile | | | |
|---|---|---|---|---|---|---|---|---|---|
| | | 2 | 4 | 8 | 16 | 2 | 4 | 8 | 16 |
| Bentgrass | C₁C₁₉ | 1 | 1 | 1.5 | 2 | 1 | 1.5 | 1.5 | 2.5 |
| Do | Pennsylvania | 1 | 1 | 1 | 1 | 1 | 1 | 1 | 1 |
| Do | Old Washington | 1 | 1 | 1.5 | 3 | 1 | 1.5 | 1 | 2 |
| Bermuda | U-3 | 1 | 1 | 1 | 1 | 1 | 1 | 1 | 1 |
| Bluegrass | Kentucky | 1 | 1 | 1 | 1 | 1 | 1 | 1 | 1 |
| Centipede Grass | | 1 | 1 | 1 | 1 | 1 | 1 | 1 | 1 |
| St. Augustine Grass | | 1 | 1 | 1 | 1 | 1 | 1 | 1 | 1 |
| Zoysia | Meyer | 1 | 1 | 1 | 1 | 1 | 1 | 1 | 1 |

In the tests, the results of which are tabulated in Tables III to VII, diphenylacetonitrile and (4-chlorophenyl) phenylacetonitrile were formulated as sprays in the following manner: 960 mg. of the compound were dissolved or wetted with 0.2 ml. of polyoxyethylene sorbitan mono-oleate. 100 ml. of water were added slowly to the resulting paste. 12.5 ml. of this formulation, when applied per 25 x 35 cm. metal flat containing the plants in boxes, gave an application rate of 16 lbs. per 200 gal. per acre. Application rates of 8, 4 and 2 lbs. of active ingredient per acre were obtained by diluting the original formulation with 1, 2 and 4 volumes of water respectively and spraying the diluted formulation at the rate of 12.5 ml. of spray per 25 x 35 cm. metal flat.

As can be seen from the results set forth in Tables III through VII, the herbicidal compositions of this invention have little or no deleterious effect upon leguminous plants nor on representative broad-leaf plants nor on turfs when applied at the rate of 2, 4 and 8 lbs. of active ingredient per acre in both pre- and post-emergent testing. At the same rate of application, the compositions containing the above two compounds have a destructive effect upon the growth, both pre- and post-emergent, of the majority of the seedling weed and desirable grasses at a rate of application of 8 lbs. per acre of herbicidal compound. A few of the crop grasses, in particular wheat, rye and oats, show some resistance to the herbicidal action of these compounds when compared with the weed grasses. This resistance, however, is actually an advantage if the compounds are to be used as herbicides near stands of these crop grasses.

EXAMPLE 3

Further tests were used to establish the lack of toxicity of the compositions of this invention for mature grasses. In the first test, bluegrass turf obtained as previously described was dusted with a formulation comprising 2 percent of the herbicidally active compound mixed with a silica dust. The formulation was dusted on the turf at the rate of 64 lbs. per acre of either diphenylacetonitrile or (4-chlorophenyl) phenylacetonitrile. No injury to the turf was noted. In a second test, turfs of bluegrass, bentgrass, zoysia, Bermuda grass, centipede grass, and St. Augustine grass were cut at a depth of 2.5 to 5 cm. below the surface of the soil, the depth of the cut being determined by the depth of the roots of the particular grass composing the turf. The cut sod was then lifted off and was inverted. Diphenylacetonitrile and (4-chlorophenyl)phenylacetonitrile were formulated as sprays in the manner previously described, and the sprays were applied to the underside of the turfs directly on the exposed roots at the rate of 64 lbs. of active ingredient per acre. The cut turf was replaced and tamped down. Observation made of the turfs 30 days later revealed no toxic manifestations in the grasses composing the turf. In the last test, turfs of bluegrass, two strains of bentgrass, zoysia, Bermuda grass, St. Augustine grass and centipede grass were sprayed at the rate of 64 lbs. per acre with a spray described hereinabove. The grasses composing the turfs showed no toxic signs after 30 days.

With regard to mammalian toxicity, the median lethal dose for diphenylacetonitrile and for (4-chlorophenyl) phenylacetonitrile when fed to rats was greater than 2 g./kg.

EXAMPLE 4

In addition to the spray and dust formulations whose preparation has been described above, the herbicidally active compounds within the scope of the above structure can be formulated as wettable powders and also in granular form suitable for spreading.

An illustrative wettable powder suitable for dilution with water to form a herbicidal spray is prepared as follows: 200 g. of a kaolin having a 325 mesh screen residue of one percent or less, having a maximum moisture content of one percent and having 87 to 92 percent of the particles with a diameter of less than 2 microns were mixed with constant stirring with 5 g. of polyoxyethylene sorbitan mono-oleate. This mixture was in turn mixed with 20 g. of a polymeric lignosulfonic acid. An additional 275 g. of the same kaolin was blended into the mixture until homogeneous. The homogeneous kaolin-surfactant mixture and 500 g. of diphenylacetonitrile were passed through a Fitz mill containing a 00 sieve. The fine powder thus obtained was blended in a twin shell blender for one hour, after which operation it was ready for dilution with water to form a spray.

(4-chlorophenyl)phenylacetonitrile can be substituted for diphenylacetonitrile in the above wettable powder formulation.

EXAMPLE 5

An illustrative granular formulation was prepared as follows: 83 g. of diphenylacetonitrile were dissolved in 245 g. of an alkylated naphthalene solvent having a specific gravity in the range of 0.922–0.963 at 60° F., having a flash point of 180° F. and distilling in the range 390–600° F. Care was taken in dissolving the diphenylacetonitrile that the solvent was not heated to a temperature higher than 50° C. The solution was then cooled to room temperature and was added with stirring to 672 g. of clay. The particular clay employed was composed of 30–60 mesh granules formed by compressing an aluminum magnesium silicate (attapulgite) having a surface area in the range of 200–220 square meters per gram. The above granular formulation is suitable for spreading over the area to be treated.

In the above formulation, (4-chlorophenyl)phenylacetonitrile can be used in place of the diphenylacetonitrile.

EXAMPLE 6

An illustrative dust formulation was prepared as follows: 900 g. of a kaolin having the same characteristics as that used in the above wettable powder formulation was mixed with 100 g. of (4-chlorophenyl)phenylacetonitrile and the mixture was blended until homogeneous. The mixture was then passed through a Fitz mill containing a 00 sieve. The resulting dust was suitable for dispersion with a dust gun.

Diphenylacetonitrile and (4-chlorophenyl)phenylacetonitrile were also prepared as a dispersion in vermiculite by contacting the vermiculite with an acetone solution of the herbicidally active ingredient. During this process the active compound was absorbed onto the vermiculite, which was separated and dried.

Other herbicidal compounds, as for example 2,4-dichlorophenoxy acetic acid and its salts, which are active against broadleaf weeds and legumes, can be incorporated into any of the above formulations by methods well known to the art.

Diphenylacetonitrile and the chlorinated diphenylacetonitriles falling within the scope of the above formula can be prepared by the process disclosed in Mills, U.S. Patent No. 2,447,419. The N-substituted diphenylacetamides falling within the scope of the above formula can be prepared by hydrolyzing the corresponding nitrile to yield diphenylacetic acid or a substituted diphenylacetic acid, treating the acid with thionyl chloride to form the corresponding acid chloride, and then reacting the acid chloride with the appropriate primary amine. The following will illustrate such preparations:

PREPARATION 1.—(2-CHLOROPHENYL)PHENYLACETONITRILE

A reaction mixture was prepared in a round-bottom flask fitted with stirrer, condenser and inlet tube from 70.3 g. of 2-chlorobenzaldehyde, 17.5 g. of hydrogen cyanide, and 67 ml. of benzene. The reaction mixture was cooled to about 0° C. with stirring, and gaseous boron trifluoride was bubbled into it. The addition of boron trifluoride was continued while maintaining the temperature of the reaction just below reflux temperature until a white solid began to appear in the condenser. The addition of boron trifluoride was continued for about 5 minutes more until the reaction mixture reached a temperature of about 80° C. It was allowed to cool to ambient room temperature and was kept at that temperature for about 72 hours. The reaction mixture containing (2-chlorophenyl)phenylacetonitrile prepared in the above reaction was washed twice with an equal volume of water, once with 10 percent sodium carbonate solution, twice with an equal volume of 10 percent aqueous sodium bisulfite and twice more with an equal volume of water. The aqueous washes were all discarded. The organic layer was dried, the benzene was removed therefrom by evaporation in vacuo and the residue comprising (2-chlorophenyl)phenylacetonitrile was distilled in vacuo. 78.3 g. of (2-chlorophenyl)phenylacetonitrile were obtained, boiling at about 139° C. at a pressure of about 0.75 mm. of mercury.

Other substituted diphenylacetonitriles prepared by the above method include:

(3-chlorophenyl)phenylacetonitrile:
  Melting point—48–49° C.
  Recrystallization solvent—mixture of benzene and hexane
  Analysis—
    Calculated: C, 73.85; H, 4.43; N, 6.15
    Found: C, 73.23; H, 5.03; N, 6.17
(4-fluorophenyl)phenylacetonitrile:
  Boiling point—109° C./0.05 mm. of Hg
  $n_D^{25} = 1.559$
  Melting point—39–41° C.
  Analysis—
    Calculated: C, 79.60; H, 4.77; N, 6.63
    Found: C, 79.09; H, 4.79; N, 6.64

PREPARATION 2.—(2,4-DICHLOROPHENYL)PHENYLACETONITRILE

Following the procedure of Preparation 1, a reaction mixture was prepared containing 87.5 g. of 2,4-dichlorobenzaldehyde, 25 ml. of hydrogen cyanide and 67 ml. of benzene, and boron trifluoride was passed into the reaction mixture. The major product of the reaction, (2,4-dichlorophenyl)phenylacetonitrile, was purified by the procedure of Preparation 1 except in one detail: the residue remaining after evaporation of the solvent was not distilled, but was crystallized directly from a mixture of benzene and hexane. 77.5 g. of (2,4-dichlorophenyl) phenylacetonitrile were obtained, melting at about 60–61° C.

*Analysis.*—Calc.: C, 64.14; H, 3.46; N, 5.34. Found: C, 64.22; H, 3.37; N, 5.36.

(3,4-dichlorophenyl)phenylacetonitrile was also prepared by the above procedure using 3,4-dichlorobenzaldehyde in place of 2,4-dichlorobenzaldehyde as a starting material. (3,4-dichlorophenyl)phenylacetonitrile melted at about 60–62° C.

*Analysis.*—Calc.: C, 64.14; H, 3.46. Found: C, 63.47; H, 3.45.

PREPARATION 3.—SUBSTITUTED DIPHENYLACETAMIDES 20 g. of an appropriately substituted diphenylacetonitrile were refluxed with a solution comprising 60 g. of potassium hydroxide in 1 l. of ethanol for about 2 hours. The ethanol was substantially completely removed in vacuo, and the residue containing a mixture of the substituted diphenylacetamide and the substituted diphenylacetic acid was diluted with 2 l. of water. The substituted diphenylacetamide was insoluble in the alkaline solution and precipitated. The precipitate was separated by filtration. The precipitate was purified by recrystallization from a suitable solvent. The following table lists amides prepared by the above method, their melting points and analyses.

*Table VIII*

| Amide | Melting point° C. | Recrystallization solvent | Analysis Calculated | | | Analysis Found | | |
|---|---|---|---|---|---|---|---|---|
| | | | C | H | N | C | H | N |
| (2-chlorophenyl)-phenylacetamide | 109–110 | Ethanol-H₂O and/or Benzene-hexane | 68.43 | 4.92 | 5.70 | 68.43 | 5.04 | 5.63 |
| (2,4-dichlorophenyl) phenylacetamide | 131–132 | | 60.02 | 3.96 | 5.00 | 60.22 | 4.11 | 4.85 |
| (4-chlorophenyl) phenylacetamide | 143–144 | | 68.43 | 4.92 | 5.70 | 68.00 | 4.98 | 5.68 |

PREPARATION 4.—N-ALKYL AND N-ALKYLENE-DIPHENYLACETAMIDES

About 5 g. of diphenylacetyl chloride were dissolved in about 25 ml. of benzene. About 3.5 g. of the appropriate primary alkyl or alkylene amine dissolved in about 25 ml. of benzene were added dropwise to the solution of the acyl chloride. After the addition had been completed, the reaction mixture was heated at refluxing temperature for about 2½ hours, then cooled. Sufficient chloroform was added to make the reaction mixture homogeneous, after which it was washed successively with 100 ml. of water, 10 percent hydrochloric acid, water, a saturated sodium bicarbonate solution and water, and was then dried over magnesium sulfate. The drying agent was removed by filtration, and the solvents were evaporated in vacuo. The residue comprising the N-alkyl- or N-alkylenediphenylacetamide formed in the above reaction was purified by recrystallization.

The following table lists N-alkyl- and N-alkylene-diphenylacetamides prepared by the above procedure, their melting points and analyses.

*Table IX*

| Name of compound | Melting point, °C. | Recrystallization solvent | Nitrogen analysis Calc. | Nitrogen analysis Found |
|---|---|---|---|---|
| N-n-propyldiphenylacetamide | 95 | Benzene-hexane | 5.53 | 5.58 |
| N-isopropyl-diphenylacetamide | 152–153 | ...do... | 5.53 | 5.69 |
| N-allyldiphenylacetamide | 103–104 | ...do... | 5.57 | 5.53 |
| N-ethyldiphenylacetamide | 135 | ...do... | 5.85 | 5.91 |

I claim:

1. A method for inhibiting the growth of germinated grass seeds and seedlings an effective amount of a compound represented by the following formula:

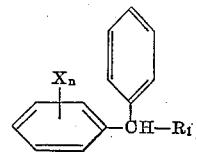

wherein X is a halogen selected from the group consisting of chlorine and fluorine, n is a number selected from the group consisting of 0, 1, 2 and 3, and R₁ is a radical selected from the group consisting of CN and CONHR, wherein R is a member of the group consisting of hydrogen, alkyl having from 1–3 carbon atoms, and alkylene having from 2–3 carbon atoms.

2. A method for destroying germinated grass seeds and seedling grasses comprising the application to a soil area infested with grass seeds and seedling grasses of an effective amount of a composition containing an inert diluent and as an active ingredient a compound represented by the formula:

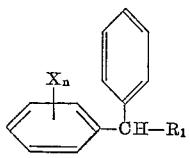

wherein X is a halogen selected from the group consisting of chlorine and fluorine, n is a number selected from the group consisting of 0, 1, 2 and 3, and R₁ is a radical selected from the group consisting of CN and CONHR, wherein R is a member of the group consisting of hydrogen, alkyl having from 1–3 carbon atoms, and alkylene having from 2–3 carbon atoms.

3. A method for inhibiting the growth of germinated grass seeds and of seedling grasses which comprises applying to a soil area infested with said grass seeds and seedling grasses an amount of about 2 to about 40 pounds per acre of a compound represented by the formula:

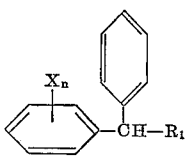

wherein X is a halogen selected from the group consisting of chlorine and fluorine, n is a number selected from the group consisting of 0, 1, 2, and 3, and $R_1$ is a radical selected from the group consisting of CN and CONHR, wherein R is a member of the group consisting of hydrogen, alkyl having from 1–3 carbon atoms, and alkylene having from 2–3 carbon atoms.

4. The method of claim 3 wherein diphenylacetonitrile is the growth-inhibitory compound.

5. The method of claim 3 wherein (4-chlorophenyl)-phenylacetonitrile is the growth-inhibitory compound.

6. The method of claim 3 wherein (4-fluorophenyl)-phenylacetonitrile is the growth-inhibitory compound.

7. The method of claim 3 wherein (3,4-dichlorophenyl)-phenylacetonitrile is the growth-inhibitory compound.

References Cited in the file of this patent

UNITED STATES PATENTS

| | | |
|---|---|---|
| 2,447,419 | Mills | Aug. 17, 1948 |
| 2,790,819 | Godfrey | Apr. 30, 1957 |

OTHER REFERENCES

Haller et al. in "Chemical Abstracts," vol. 47, 1953, col. 8305h.

King: "Insecticides and Repellants," Agricultural Handbook No. 69, issued May 1954, pages 24 and 38.

Shishido et al. in "Chemical Abstracts," vol. 50, 1956, col. 4223F.

Gokhale et al.: "Chemical Abstracts," vol. 43, 1949, and 1144d.

UNITED STATES PATENT OFFICE
CERTIFICATE OF CORRECTION

Patent No. 3,063,822 November 13, 1962

Quentin F. Soper

It is hereby certified that error appears in the above numbered patent requiring correction and that the said Letters Patent should read as corrected below.

Column 4, lines 3 and 4, for "2-chlorophenyl)" read -- (2-chlorophenyl) --; columns 9 and 10, Table VI, the datum for "Radish, Early Scarlet" under the heading "Diphenylacetonitrile, Post 16" for "½" read -- 1 --; the datum for "Tomatoes, Bonney Best" under the heading "Diphenylacetonitrile, Post 16" for "½" read -- 2 --; column 14, line 40, strike out "grass seeds and of seedling grasses which comprises apply-", and insert the same after "germinated" in line 75, column 13.

Signed and sealed this 14th day of May 1963.

(SEAL)
Attest:

ERNEST W. SWIDER
Attesting Officer

DAVID L. LADD
Commissioner of Patents